May 31, 1927. 1,630,886

A. BEYER

DRIVING WHEEL

Filed Feb. 26, 1926

Inventor:
Albert Beyer
By Kent W. Wonnell
Atty.

Patented May 31, 1927.

1,630,886

UNITED STATES PATENT OFFICE.

ALBERT BEYER, OF BERLIN, GERMANY.

DRIVING WHEEL.

Application filed February 26, 1926, Serial No. 90,983, and in Germany April 3, 1925.

This invention relates to an improved driving wheel.

Driving wheels are already known wherein the rims are mounted so as to be universally movable about a hub on a shaft to provide an elastic energy transmission.

According to the present invention in a wheel of this type the connection between the rim of the wheel and the spherically formed hub is effected by driving pins which are fixed in the hub and engage in slots located in the rim of the wheel.

The construction may in this way be effected in a very simple and cheap form. Using this form of construction the rim is freely movable on the spherically shaped hub and also the smallest forces set up are effective. The slots in which the driving pins engage receive resilient means transmitting the forces from the rim to the hub so that the resilient means are completely protected against temperature effects and dust or sand. The slots may also be used to receive lubricating material adapted to feed the sliding surfaces of the wheel rim and hub. The sliding surfaces may also be specially protected by caps of leather or the like.

The subject of the invention is shown in one form of construction applied to a pulley by way of example in the accompanying drawings, in which—

Figure 1:
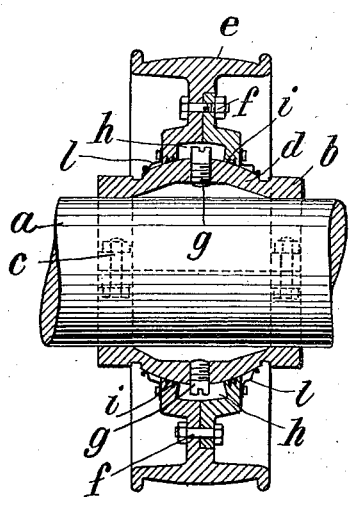
Figure 1 is a section through the driving wheel together with the hub casing.
Figure 2:
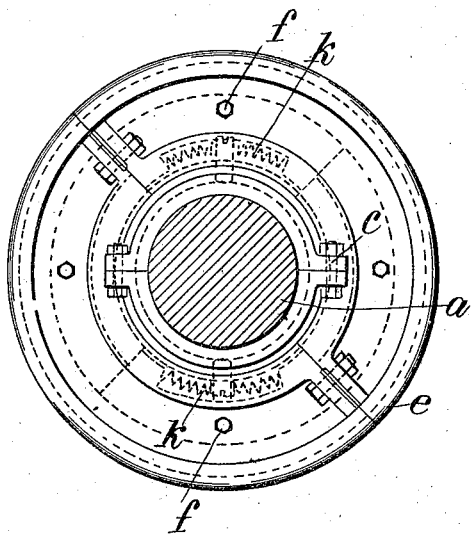
Figure 2 is a plan view of Figure 1.
Figure 3:
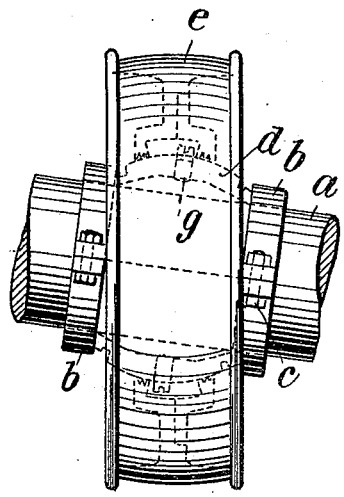
Figure 3 is an elevation in which the driving shaft has been turned toward the right, and Figure 4 an elevation in which the driving shaft has been turned towards the left.
Figure 4:
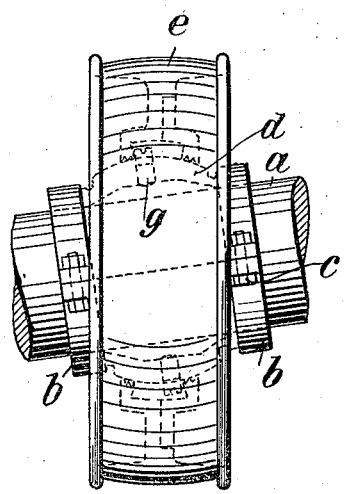

The hub casing $b$ is tightly secured on the shaft $a$ by means of the bolts $c$. The casing has a spherical upper surface $d$ against which bears the correspondingly shaped rim of the driving wheel $e$. The rim and the hub are connected by driving pins $g$ located on the hub and engaging in slits $h$ which are formed between a cut away portion of the lower side of the rim of the wheel and the hub. In this way universal movement of the rim relatively to the hub is possible. Figures 3 and 4 show two different positions of the driving wheel on the hub.

Springs, rubber buffers or the like $k$ are arranged in front and to the rear of the pins $g$ in the slots $h$, so that the springs absorb the shocks set up in both directions of rotation and transmit the rotation of the wheel to the hub. Lubricating ducts or channels $i$ are located in the bearing faces of the wheel rim $e$ and are fed by a lubricating agent introduced into the slots $h$. In this way friction between the bearing surfaces is reduced and easy adjustment of the driving wheel on the hub is rendered possible. A cap $l$ of leather or the like may be introduced for protection against dirt.

I claim:

1. A driving wheel comprising a hub member having an outer spherical bearing surface, a rim member having an inner spherical bearing surface resting on said surface of said hub member and slotted, and a pin mounted in said hub member and projecting into the slot of said rim member with lost motion in any direction.

2. A driving wheel comprising a hub member having an outer spherical bearing surface, a rim member having an inner spherical bearing surface resting on said surface of said hub member and slotted, a pin mounted in said hub member and projecting into the slot of said rim member with lost motion in any direction and resilient means limiting the movement of said pin in said slot in the direction of rotation of said members about the axis thereof.

3. A driving wheel comprising a hub member having an outer spherical surface, a rim member having an inner spherical surface mounted on said outer surface of said hub member said inner surface being slotted centrally and provided with lubricating ducts, at least one pin member mounted in the outer surface of said rim member and projecting into said slot with lost motion in all directions and resilient means limiting the movement of said pin in said slot in the directions of rotation of said members about the axis thereof.

4. A driving wheel comprising a hub member having an outer spherical surface, a rim member having an inner spherical surface mounted on said outer surface of said hub member said inner surface being slotted centrally and provided with lubricating ducts, at least one pin member mounted in the outer surface of said rim member and projecting into said slot with lost motion in all directions, resilient means limiting the movement of said pin in said slot in the directions of rotation of said members about the axis thereof and lubricating material disposed within said slot.

5. A driving wheel comprising a hub member having an outer spherical bearing surface, a rim member having an inner spherical bearing surface resting on said surface of said hub member and slotted, a pin mounted in said hub member and projecting into the slot of said rim member with lost motion in any direction, resilient means limiting the movement of said pin in said slot in the directions of rotation of said members about the axis thereof and flexible caps mounted on said rim member and covering the outer bearing surface of said hub member.

In testimony whereof I have affixed my signature to this specification.

ALBERT BEYER.